United States Patent [19]

Erekson

[11] 3,888,363

[45] June 10, 1975

[54] INDEXING STACKER

[75] Inventor: Arthur B. Erekson, San Diego, Calif.

[73] Assignee: Borden, Inc., Columbus, Ohio

[22] Filed: Oct. 29, 1973

[21] Appl. No.: 410,436

[52] U.S. Cl. ............ 214/6 D; 93/93 C; 211/58; 214/8; 271/64; 271/213
[51] Int. Cl. ............... B65g 57/14; B65h 33/14
[58] Field of Search .......... 214/6 R, 6 D, 6 DK, 6 F, 214/6 H, 6 N, 6 S, 6.5, 8; 271/64, 213; 198/25, 35, 209; 53/59 R, 159, 246; 93/93 R, 93 C, 93 DP; 211/58, 131

[56] References Cited
UNITED STATES PATENTS

| 274,087 | 3/1883 | Danner | 211/131 X |
|---|---|---|---|
| 867,684 | 10/1907 | Thomas | 271/213 |
| 2,133,189 | 10/1938 | Dalton | 93/93 DP |
| 2,669,362 | 2/1954 | Joy | 211/58 |
| 3,013,671 | 12/1961 | Lamb | 214/6 H |
| 3,073,431 | 1/1963 | Davis et al. | 211/131 X |
| 3,542,214 | 11/1970 | Helms | 214/6 H |
| 3,791,537 | 2/1974 | Conklin | 214/6 H X |

Primary Examiner—Robert J. Spar
Assistant Examiner—L. J. Paperner
Attorney, Agent, or Firm—George P. Maskas; George A. Kap

[57] ABSTRACT

The indexing stacker is composed of four compartments which are defined by three vertical side walls and a bottom wall which is inclined towards the center of the stacker in the X and Z planes. The bottom wall has a substantial cut-out exposed on the open side of the compartment which allows insertion of fingers under a stack of articles to facilitate removal of same. A post is mounted in the cut-out region to provide support for the stack of articles. Means are provided for indexing the stacker 90° every time a stack of pre-determined number of articles is formed in the compartment. The articles are delivered to each compartment by a conveying means which is in continuous operation. Indexing of the stacker is made in the interval between two successive articles. A number of such stackers can be arranged in a line and operated by a common drive means.

10 Claims, 5 Drawing Figures

INDEXING STACKER

This invention relates to an improvement in the food packaging art and more specifically, deals with an indexing stacker and counter for individually wrapped packages such as wrapped cheese slices.

The marketing of many food products requires the packaging of a plurality of pre-cut slices for the convenience of the consumer who normally prefers the product in slice form. A typical example is cheese, particularly process cheese, which is often employed by the consumer in the preparation of sandwiches. However, sliced process cheese has the undesirable tendency of the slices clinging to one another. When packaged by modern techniques where the outer wrapper very tightly embraces a group of slices and where air is withdrawn from the package, the characteristic is increased almost to the loss of identity of separate slices. In addition, once a package of this type has been opened and one or more slices has been removed therefrom, it is difficult to properly rewrap the remaining slices so as to protect them from the atmosphere which will cause the slices to dry out, harden and acquire an unattractive appearance.

Heretofore, in an attempt to alleviate this problem, producers of sliced cheese have attempted various solutions including interleaving successive slices with sheets of parchment paper and the like. While these attempts have succeeded to some degree, accurate placement of the interleaves is required, and even then the edges of successive slices may become compressed to the point of joining with one another.

More recently, attempts have been made to individually wrap each successive slice so as to completely enclose all of the product surfaces. This technique is expensive where performed by hand on presliced product and hence there has been a tendency to direct efforts toward the molding of the cheese material within an envelope of wrapping material. However, in such a process, the hot molten cheese tends to cause delamination of the wrapping material.

There presently exists in the cheese industry highly efficient cheese forming machines for producing very large quantities of process cheese in the form of multiple ribbons having the thickness and width of single slices which are subsequently severed transversely into individual slice lengths. It seens practical to take such slices and wrap them individually in suitable transparent plastic film.

Briefly, the present method involves the cutting of a continuously produced ribbon of product into successive slices which are received upon a continuous web of film that is folded about the sides and across the top of the slices while being drawn in a given direction and at a speed in excess of that of the ribbon of product. The film is drawn by engaging and propelling it along spaces between successive slices caused by the relatively greater speed of the film; and the film is first sealed and then severed at those spaces while thus engaged. The severing of the film is limited to occur only just prior to disengagement from whence each enwrapped slice is positively discharged in the same direction.

Various flexible sheet materials, plastic films, coated foils, etc. have been used in cheese packaging for a number of reasons. Firstly, they provide an inexpensive airtight wrapper which will maintain the perishable cheese in a state of freshness for a relatively long period of time. Secondly, such wrapping materials provide a highly attractive package and when transparent films are used, the product can be viewed by the consumer while it is still in the package.

The invention herein relates particularly to an indexing stacker and counter. After a slice of cheese has been cut from a ribbon of cheese, it is wrapped in a continuous sheet of film and the wrapped cheese slice is cut-off in the wrapping machine. The wrapped cheese slice then drops onto a conveyor which transports it to the indexing stacker and counter, depositing it in one of four compartments. Other slices of cheese follow with the result that in a short period of time, a stack of cheese slices accumulates in the compartment of the indexing stacker and counter. Each compartment is formed with a rear partition and a support plate inclined in the direction of the slice travel so that a well-formed stack of cheese slices is obtained.

When the required number of cheese slices are in the stack, a single revolution clutch, controlled by a counter chain, is engaged by a micro-switch on the counter energizing a solenoid. The clutch makes one complete revolution in 0.4 seconds causing the indexing stacker to index or revolve 90° through bevel gears and pinions to present an empty compartment or magazine for filling with the oncoming cheese slices from the conveyor. The finished stack is removed by an operator who places it on another conveyor whereby it is taken to a station where the stacks are placed in boxes. It is a foregone conclusion that to obviate manual handling, automated means can be devised to remove a stack of slices from the stacker and place it in a package.

The indexing stacker must index the compartments in the time interval between cheese slices. This is accomplished by rotating the micro-switch position around the axis of the counter chain sprocket. The slices are 3¼ by 3/12 inches.

The various features of the apparatus of this invention will become apparent from the following detailed description set forth in connection with the accompanying drawings which relate to the preferred embodiment of the indexing stacker and counter which are given by way of illustration.

Figure 1:
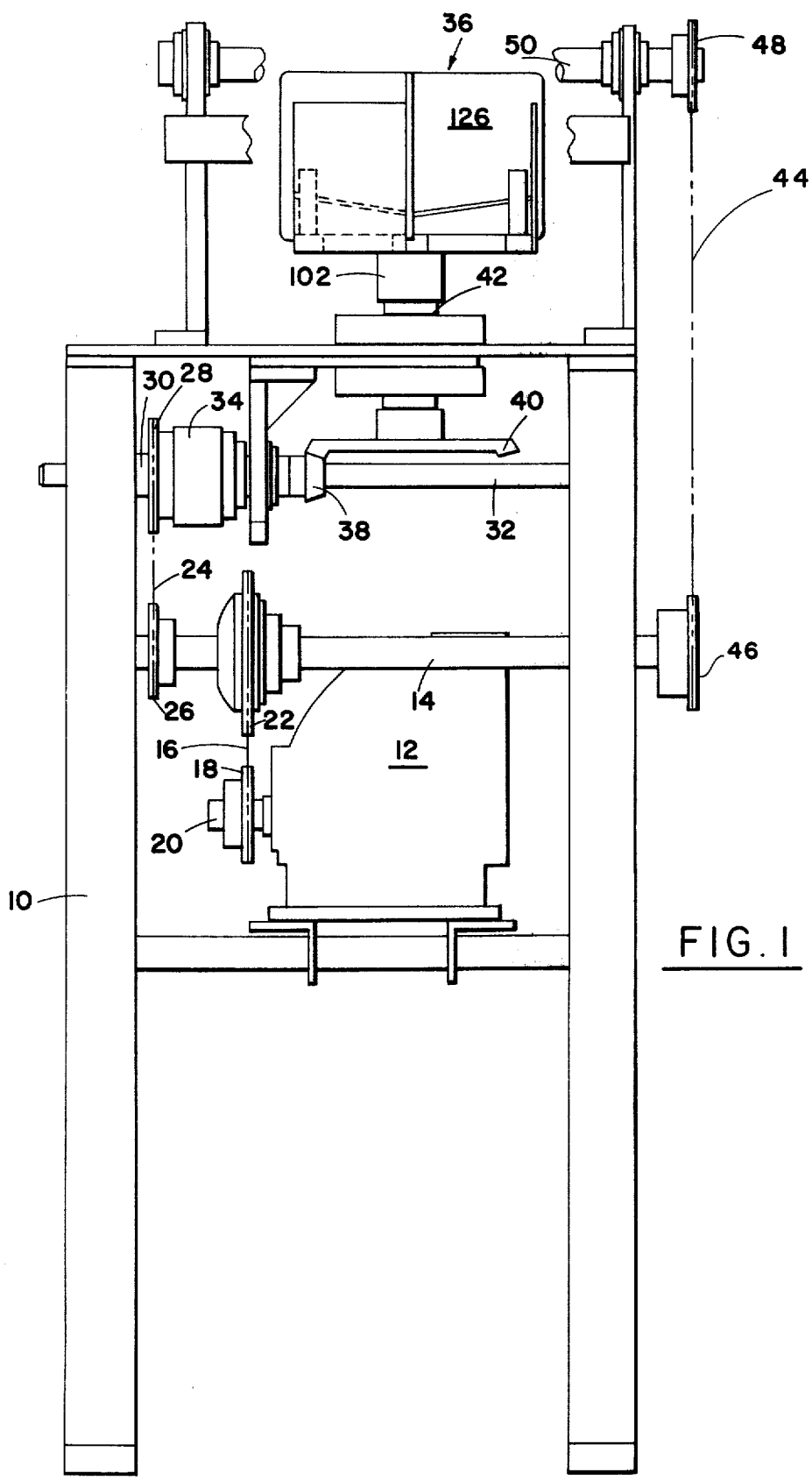
FIG. 1 is a front view of the indexing stacker and counter showing the motor, single revolution clutch, gear and pinion which index the stacker.

Referring now to the drawings, the indexing stacker and counter is mounted on a suitable supporting frame designated in its entirety by reference numeral 10 which can be formed of angle irons or any other suitable construction. Motor 12 drives shaft 14 by means of chain 16 entrained around sprocket 18 mounted on the motor drive shaft 20 and sprocket 22 affixed on shaft 14. Another chain 24 is entrained about sprockets 26, 28 and transmits rotary motion from shaft 14 to shaft 30 which is coupled to shaft 32 through single revolution coupling 34. When coupling 34 is actuated, it indexes or revolves stacker 36 through a turn of 90° by means of pinion gear 38 engaging and driving bevel gear 40 which in turn is coupled to vertical shaft 42 on which stacker 36 is supported.

At right side of FIG. 1, chain 44 is entrained over sprocket 46 on shaft 14 and sprocket 48 on shaft 50. Shaft 50 is disposed somewhat ahead and above stacker 36, as is apparent from FIG. 2, so that conveyor 52 is driven thereby carries individually wrapped cheese slices 54 to one of the compartments in stacker 36.

Figure 2:
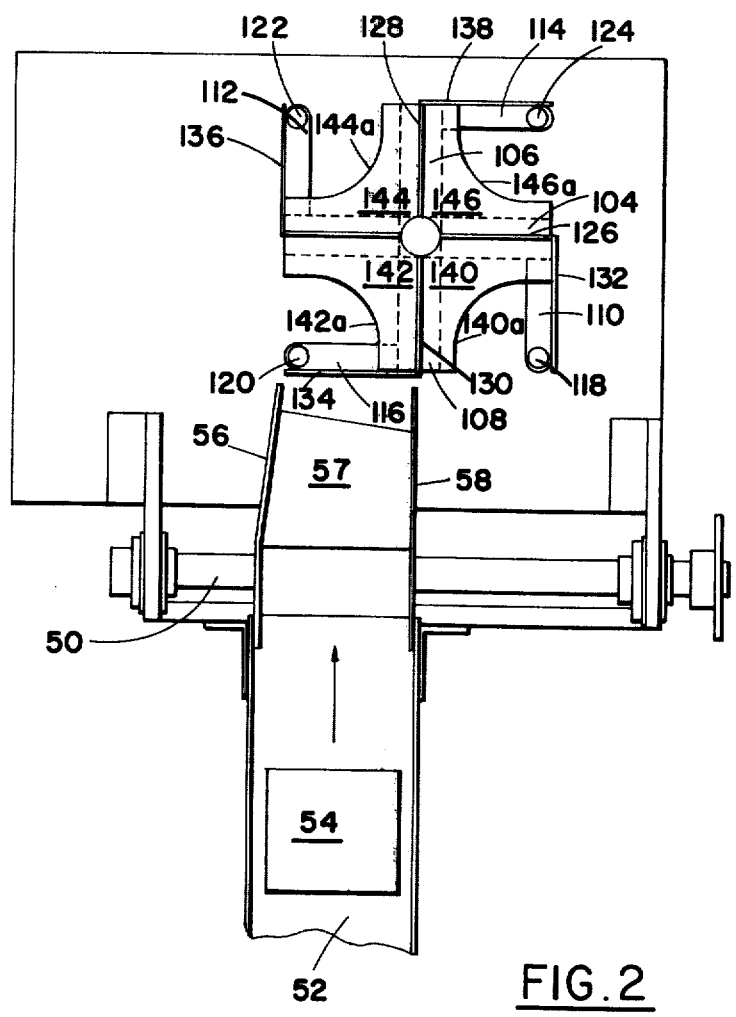
FIG. 2 is a top elevation view of the stacker illustrating the stacker composed of four compartments and a conveyor belt delivering individually wrapped cheese slices from the wrapping machine.
Figure 3:
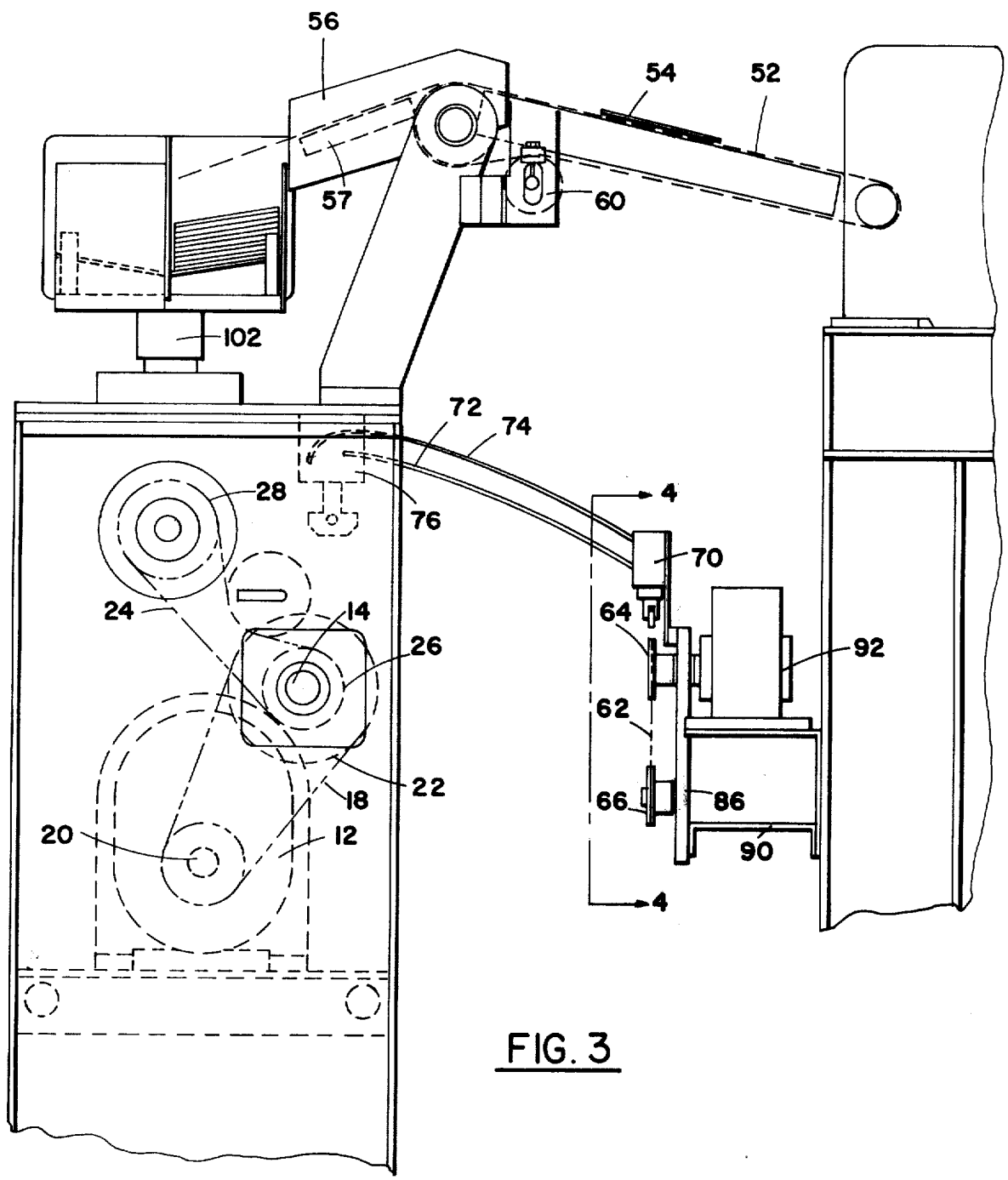
FIG. 3 is an end view of the stacker together with the microswitch which is actuated by a link on a counter chain to drive a single revolution clutch which is engaged to the stacker and indexes it 90° every revolution the clutch makes.

As shown in FIG. 2, stacker 36 is oriented in such a way as to present one of the four compartments in alignment with conveyor 52. Slices 54 come off the conveyor into the stacker compartment or magazine and are stacked as shown in FIG. 3. At the terminal end of conveyor 52, there are provided a pair of guide rails 56, 58 shown in FIG. 2. Guide rail 56 has an inwardly directed bend which restricts the path of travel of the slice so that it accurately registers with and is properly delivered to a compartment.

Figure 5:
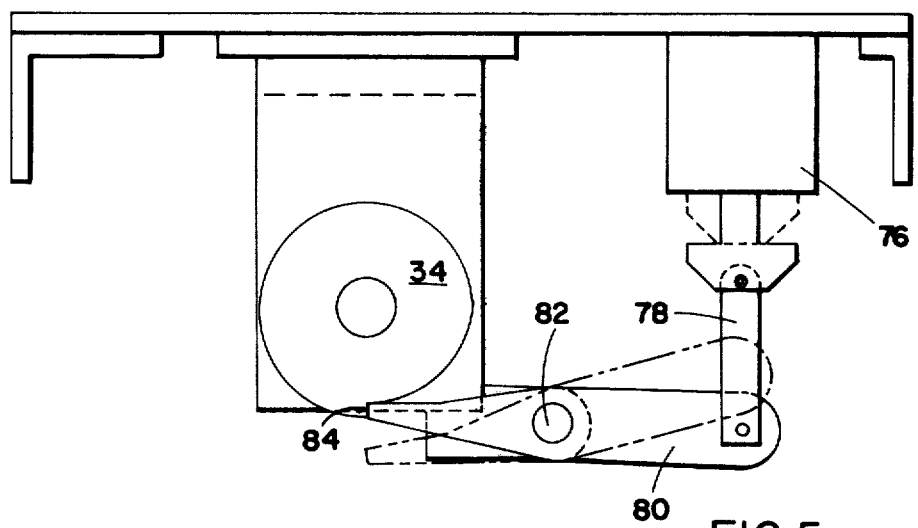
FIG. 5 illustrates the solenoid which is actuated by the microswitch and which controls the single revolution clutch.
Figure 4:
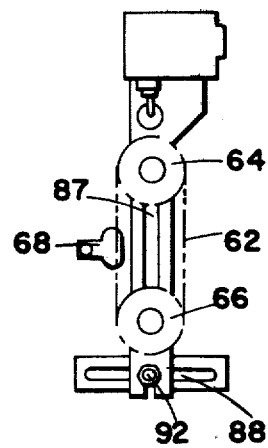
FIG. 4 is a front view of the counter mechanism taken along plane 4—4 of FIG. 3.

FIG. 3 illustrates additional refinements of the apparatus described herein. Means generally designated by reference numeral 60 is used to adjust the elevation of conveyor 52 so that the slices follow a desired trajectory after leaving the conveyor and after passing over downwardly inclined chute 57. Counter chain 62 is wrapped around a pair of spaced sprockets 64, 66 and has affixed thereto an actuating link 68. When link 68 contacts micro-switch 70, an electrical impulse is transmitted via electrical wires 72, 74 to solenoid 76, which is more clearly illustrated in FIG. 5. Upon actuation of solenoid 76, plunger 78 is momentarily retracted turning pawl 80 around its fulcrum point 82 in a counterclockwise direction to disengage from shoulder 84 in single revolution clutch 34. When this happens, clutch 34 engages shaft 32 to index the stacker 90° by revolving itself 360°.

Chain 62 is carefully selected since it controls the number of slices that are deposited in a stacker magazine before the stacker is indexed to an empty magazine. As shown in FIG. 3 specifically, sprockets 64, 66 are supported on frame 86 which is adjustably affixed in slot 88 of channel 90. Sprockets 64, 66 are disposed in slot 87 of frame 86 and can be adjusted up or down to accommodate any chain which might be installed to control number of slices which are deposited in the stacker. Motor 92 drives sprocket 64 in phase with the main motor 12.

Indexing stacker 36 rests on collar 102 with its supporting base consisting of unitary bar 104, which extends centrally the length of the stacker, and bar elements 106, 108 which extend transversely to bar 104 forming a cross-shaped base, as best shown in FIG. 2. The center of the cross base rests squarely on the center of rotating shaft 42. Peripheral bars 110 and 112 are welded to the base bar 104 at its outer extremity and extend from base bar 104 in opposite directions. Additional peripheral bars 114 and 116 are secured to base bars 106 and 108; peripheral bar 114 being secured to base bar 106 and peripheral bar 116, to base bar 108. All of the bars in the base construction, which includes bars 104, 106, 108, 110, 112, 114 and 116, are substantially disposed in a horizontal plane. The bars are secured to each other by welding. Four vertical posts 118, 120, 122 and 124 are disposed at the terminal tips of the peripheral bars. These posts are about 1 inch in height and are provided for supporting stacked cheese slices.

Indexing stacker also includes a number of upstanding plates which subdivide the stacker into four compartments or magazines. Vertical unitary plate 126 is disposed centrally on and is secured by welding to unitary bar 104. Its width is substantially the same as the length of the bar 104. An elongated channel can be formed in bar 104 running lengthwise and centrally thereof for cradling plate 126 so that the plate would be more securely attached to the bar. A pair of divider plates 128, 130 extend at right angles to plate 126 along base bars 106, 108 to thus subdivide the stacker into four compartments. Confining or side plates 132, 134, 136 and 138 are welded to the peripheral bars 110, 116, 112 and 114, respectively, to define the compartments of the stacker. As is apparent from FIG. 2, each compartment of the stacker is defined by side walls on three sides. One side is purposely left open so that an operator's hand could enter a compartment to remove a stack of individually wrapped cheese slices.

The side or peripheral plates are provided at diagonally opposed sites and extend vertically above the posts. With respect to divider plates 126, 128 and 130, the side plates extend vertically below these plates. When a cheese slice is conveyed into a compartment, it flies above the peripheral plate, bounces off the divider plate and settles in the compartment squarely by virtue of the inclination of the bottom plate.

The bottom of each compartment is formed by plates 140, 142, 144 and 146 which are welded to the adjoining side plates. To facilitate removal of the stack of cheese slices, each bottom plate is provided with a cut-out which is defined by a borderline 140a, 142a, 144a and 146a. The portion of each bottom plate which is removed to form the cut-out constitutes one substantial corner thereof and between ¼ and ½ of the total surface area. The cut-out extends about ¾ of the distance from the removed corner to the adjoining corners on both sides thereof. These cut-outs are provided to enable an operator to insert the index and third fingers under the protruding portion of the cheese stack and remove the stack with the aid of the thumb. Each bottom plate is tilted in both the X and Z planes towards its apex or inner corner which is disposed at the center of the indexing stacker. Thus, when a cheese slice is directed into a compartment, it first clears the side plate, bounces off against a divider plate, drops into the compartment and then slides down the tilted bottom plate to settle squarely within the compartment. Whereas the cheese slice is supported by the bottom plate at three corners thereof, the post supports it at the fourth corner. Due to arrangement of the indexing stacker, the succeeding slices likewise are stacked in a similar fashion, one directly above another.

Although one indexing stacker has been described and illustrated, it should be understood that a number of them can be arranged in line driven by a common shaft.

In operation, a suitable timing belt is selected to deliver a specified number of cheese slices to an indexing stacker. The belt is secured around sprockets 64, 66, the bottom one of which is moved within slot 87 until proper arrangement is affected. The stacker is disposed with respect to chute 57 in such a manner that the side plate is in abutting relationship with the chute. The individually wrapped cheese slices are conveyed over conveyor 52 and chute 57. Beyond chute 57, a cheese slice sails through the air at a predetermined trajectory and bounces off one of the vertical dividing plates into the compartment. This operation is repeated until a predetermined number of slices has been deposited in the compartment. When this happens, the link on the belt contacts micro-switch 70 which actuates the single revolution cluth 34 to index the stacker 90°. The operator removes the cheese stack from the compartment by the use of the thumb and the index and third fingers. This is a simple operation which is facilitated by the cut-out in the bottom plate and its inclined disposition. When a plurality of stackers are arranged in a line, indexing thereof is made from the same drive shaft with the result that all of the stackers will be indexed simultaneously. One operator is able to handle several stackers in a line. The time that is allotted for removal of a stack of cheese slices from a compartment is adequate. The operator has the opportunity to remove the cheese stack from the first indexing, when a full compartment has been indexed, until the same compartment is again indexed into a receiving position. The time is equivalent to two complete indexings.

We claim:

1. Apparatus, including a stacker and a conveyor means having an article supporting surface, for stacking substantially flat individual articles of a regular geometric form, said stacker comprising four compartments having a common apex; a common dividing wall between adjoining compartments; a peripheral wall disposed on the outside of each compartment defining an outside wall thereof, said peripheral walls are in a diagonal disposition and are of a lesser vertical extent than said dividing walls and said surface of said conveyor means; and a bottom wall defining the floor of each compartment disposed with an inclination in the X and Z planes directed downwardly to the common apex; wherein said conveyor means moves the articles to one of said compartments at a time.

2. Apparatus of claim 1 including a cut-out, which amounts to between ¼ and ½ of the entire bottom wall of each compartment, in each of said bottom walls for allowing an operator to insert fingers below a stack of articles, the cut-outs encompassing a corner of each of said bottom walls and are diagonally disposed.

3. Apparatus of claim 2 including a vertical post in each of said compartments of lesser vertical extent than said peripheral walls, each post being positioned on the diagonal in the cut-out and is provided for the purpose of supporting the outer corner of a stack of articles.

4. Apparatus of claim 3 wherein the top of said post lies in the plane of said bottom wall in each compartment which permits the articles to lie flat on said bottom wall and said post.

5. Apparatus of claim 3 including a rotatable shaft, a supporting base made from bar elements in the form of a cross, said base supporting said dividing and peripheral walls.

6. Apparatus of claim 3 including means for intermittently indexing said stacker 90°.

7. Apparatus of claim 6 wherein said indexing means includes a main drive shaft coupled to said stacker and said conveyor means; a single revolution clutch engaging said shaft; a micro-switch for actuating said clutch to rotate said shaft so as to index said stacker 90°; a belt mounted for rotation about a pair of fixed points, and a link secured to said belt for intermittently actuating said micro-switch.

8. Apparatus of claim 7 including means for varying timing for actuating said clutch.

9. Apparatus of claim 8 wherein said timing means includes a pair of sprockets, a slotted frame for supporting said sprockets and means for varying the distance between said sprockets so that a different belt with a link could be applied thereabout to actuate said clutch at predetermined intervals.

10. Apparatus of claim 8 including a plurality of stackers actuated by said drive shaft; a plurality of conveying means driven by said drive shaft corresponding to number to the number of stackers, said conveying means being disposed with respect to each stacker to deliver the articles into the compartments thereof; said clutch and said belt are coupled to said drive shaft to affect indexing of said plurality of stackers in unison.

* * * * *